US011303487B2

(12) United States Patent
Kuriyama et al.

(10) Patent No.: US 11,303,487 B2
(45) Date of Patent: Apr. 12, 2022

(54) WIRELESS COMMUNICATION SYSTEM, WIRELESS COMMUNICATION METHOD, AND TRANSMITTING DEVICE

(71) Applicant: NIPPON TELEGRAPH AND TELEPHONE CORPORATION, Tokyo (JP)

(72) Inventors: Keita Kuriyama, Musashino (JP); Hayato Fukuzono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/976,327

(22) PCT Filed: Feb. 25, 2019

(86) PCT No.: PCT/JP2019/007037
§ 371 (c)(1),
(2) Date: Aug. 27, 2020

(87) PCT Pub. No.: WO2019/167877
PCT Pub. Date: Sep. 6, 2019

(65) Prior Publication Data
US 2021/0051051 A1    Feb. 18, 2021

(30) Foreign Application Priority Data
Mar. 1, 2018   (JP) .............................. JP2018-036574

(51) Int. Cl.
*H04L 27/26*  (2006.01)
*H04B 17/336*  (2015.01)
(Continued)

(52) U.S. Cl.
CPC ....... *H04L 27/2607* (2013.01); *H04B 17/336* (2015.01); *H04L 1/0003* (2013.01); *H04L 25/0212* (2013.01)

(58) Field of Classification Search
CPC ............... H04L 27/2607; H04L 1/0003; H04L 25/0212; H04L 1/0009; H04L 1/0007;
(Continued)

(56) References Cited

U.S. PATENT DOCUMENTS

| 11,075,786 B1 * | 7/2021 | Shattil ................. H04J 13/0003 |
| 2009/0060100 A1 * | 3/2009 | Nishio ................. H04L 27/2662 375/344 |
| 2010/0246377 A1 | 9/2010 | Zhang et al. | |

FOREIGN PATENT DOCUMENTS

| JP | 2009510918 A | 3/2009 |
| JP | 2011172176 A | 9/2011 |
| JP | 2017152846 A | 8/2017 |

OTHER PUBLICATIONS

LAN/MAN Standards Committee, "WirelessLAN Medium Access Control (MAC) and Physical Layer (PHY) Specifications." Mar. 29, 2012.

* cited by examiner

*Primary Examiner* — Fitwi Y Hailegiorgis

(57) ABSTRACT

[Problem]
Conventionally, in a wireless communication system that performs single-carrier communication with formation of symbol blocks, it has been difficult to select the optimal GI length and modulation and coding method that achieve the maximum throughput.
[Means of Solution]
A transmission device and a reception device are included. The transmission device includes: a transmission-side communication unit that performs communication using a single
(Continued)

or a plurality of antennas; a modulation unit that generates a single-carrier signal in which a symbol block has been formed; a GI insertion unit; a weight multiplication unit that performs multiplication by a weighting coefficient; and a control unit that obtains information of an impulse response of a communication path from the reception device by transmitting a training signal before starting communication, calculates the weighting coefficient, and determines a modulation and coding method and a length of a GI that achieve the maximum throughput in accordance with SINRs in a specific period that are calculated by changing a length of the GI. The reception device includes an estimation unit that estimates the impulse response of the communication path using a training signal transmitted from the transmission device, and notifies the transmission device of information of the estimated impulse response of the communication path.

5 Claims, 8 Drawing Sheets

(51) Int. Cl.
*H04L 1/00* (2006.01)
*H04L 25/02* (2006.01)
(58) Field of Classification Search
CPC ............ H04L 25/0226; H04L 27/2636; H04L 27/2605; H04L 27/00; H04B 17/336; H04B 17/364; H04B 17/345; H04B 7/0456
USPC ........................................................ 370/329
See application file for complete search history.

Fig. 5

| MCS INDEX | MODULATION METHOD | CODING RATE | LOWEST RECEIVING SENSITIVITY (Δf:20MHz) (dBm) | LOWEST RECEIVING SENSITIVITY (Δf:40MHz) (dBm) | LOWEST RECEIVING SENSITIVITY (Δf:80MHz) (dBm) | LOWEST RECEIVING SENSITIVITY (Δf:160MHz or 80+80MHz) (dBm) |
|---|---|---|---|---|---|---|
| 0 | BPSK | 1/2 | −82 | −79 | −76 | −73 |
| 1 | QPSK | 1/2 | −79 | −76 | −73 | −70 |
| 2 | QPSK | 3/4 | −77 | −74 | −71 | −68 |
| 3 | 16QAM | 1/2 | −74 | −71 | −68 | −65 |
| 4 | 16QAM | 3/4 | −70 | −67 | −64 | −61 |
| 5 | 64QAM | 2/3 | −66 | −63 | −60 | −57 |
| 6 | 64QAM | 3/4 | −65 | −62 | −59 | −56 |
| 7 | 64QAM | 5/6 | −64 | −61 | −58 | −55 |
| 8 | 256QAM | 3/4 | −59 | −56 | −53 | −50 |
| 9 | 256QAM | 5/6 | −57 | −54 | −51 | −48 |

Fig. 6

| MCS INDEX | MODULATION METHOD | CODING RATE | TRANSMISSION SPEED (Mb/s) | |
|---|---|---|---|---|
| | | | GI:800ns | GI:400ns |
| 0 | BPSK | 1/2 | 6.5 | 7.2 |
| 1 | QPSK | 1/2 | 13.0 | 14.4 |
| 2 | QPSK | 3/4 | 19.5 | 21.7 |
| 3 | 16QAM | 1/2 | 26.0 | 28.9 |
| 4 | 16QAM | 3/4 | 39.0 | 43.3 |
| 5 | 64QAM | 2/3 | 52.0 | 57.8 |
| 6 | 64QAM | 3/4 | 58.5 | 65.0 |
| 7 | 64QAM | 5/6 | 65.0 | 72.2 |
| 8 | 256QAM | 3/4 | 78.0 | 86.7 |
| 9 | | | (Not valid) | |

WIRELESS COMMUNICATION SYSTEM, WIRELESS COMMUNICATION METHOD, AND TRANSMITTING DEVICE

CROSS-REFERENCE TO RELATED APPLICATIONS

This application is a 371 U.S. National Phase of International Application No. PCT/JP2019/007037, filed on Feb. 25, 2019, which claims priority to Japanese Application No. 2018-036574, filed on Mar. 1, 2018. The entire disclosures of the above applications are incorporated herein by reference.

TECHNICAL FIELD

The present invention relates to a technique to improve throughput while reducing distortion caused by delay waves in a wireless communication system that performs single-carrier communication with formation of symbol blocks.

BACKGROUND ART

Conventionally, in order to avoid the influence of delay waves, a technique to add a guard interval (GI) in front of a data period formed as a symbol block has been used. For example, a transmission side adds signals at the end of the data period as a GI (cyclic prefix), and a reception side removes the GI; in this way, communication can be performed while suppressing interference between symbol blocks in an environment with delay waves that do not exceed the GI length.

However, when long delay wave components that exceed the GI length exist, distortion caused by interference between symbol blocks occurs, and larger delay wave components have greater influence. Although the influence of delay waves can be reduced by adding a GI that has a sufficient length relative to the spread of delay waves, making the GI length too long gives rise to the problem of reduction in transmission efficiency.

In view of this, a technique to improve throughput in an OFDM (Orthogonal Frequency Division Multiplexing) communication system that uses frequency-domain signals by optimizing a GI length and a modulation and coding method in a long delay wave environment has been studied (see, for example, PTL 1).

CITATION LIST

Non Patent Literature

[NPL 1] Wireless LAN Medium Access Control (MAC) and Physical Layer (PHY) Specifications, IEEE Std. 802.11-2012.

Patent Literature

[PTL 1] Japanese Patent Application Publication No. 2017-152846

SUMMARY OF THE INVENTION

Technical Problem

However, the aforementioned conventional technique is targeted for a multi-carrier system that uses frequency-domain signals, and application to a single-carrier system that uses time-domain signals has not been considered. Therefore, there has been a problem that, in a wireless communication system that performs single-carrier communication with formation of symbol blocks, when reception signals include delay wave components that exceed the GI length, it is difficult to select the GI length and the modulation and coding method that achieve the maximum throughput from among selectable GI lengths and modulation and coding methods.

An object of the present invention is to provide a wireless communication system, a wireless communication method, and a transmission device that can select the optimal GI length and modulation and coding method that achieve the maximum throughput while suppressing the influence of delay waves in single-carrier communication with formation of symbol blocks that uses time-domain signals.

Means for Solving the Problem

A wireless communication system according to a first invention includes: a transmission device; and a reception device, the transmission device including at least: a transmission-side communication unit that performs communication using a single or a plurality of antennas; a modulation unit that generates a single-carrier signal in which a data signal or a training signal has been formed as a symbol block; a guard interval insertion unit that inserts a guard interval into a signal output from the modulation unit and transmits the signal from the transmission-side communication unit; a weight multiplication unit that performs, between the modulation unit and the guard interval insertion unit, multiplication by a weighting coefficient for separating a signal that is transmitted/received by an antenna; and a control unit that obtains information of an impulse response of a communication path by transmitting a training signal before starting communication, calculates the weighting coefficient based on the impulse response of the communication path, and determines a modulation and coding method and a length of the guard interval that achieve a maximum throughput in accordance with SINRs in a specific period that are calculated by changing a length of the guard interval, the reception device including at least: a reception-side communication unit that performs communication using a single or a plurality of antennas; and an estimation unit that estimates the impulse response of the communication path using a training signal transmitted from the transmission device, and notifies the transmission device of information of the estimated impulse response of the communication path via the reception-side communication unit.

A second invention is the wireless communication system according to the first invention, wherein the reception device further includes: a guard interval removal unit that removes the guard interval in a signal received from the transmission device; a demodulation unit that demodulates a single-carrier signal output from the guard interval removal unit; and a reception-side weight multiplication unit that performs, between the guard interval removal unit and the demodulation unit, multiplication by an entirety or a partial share of the weighting coefficient by which the weight multiplication unit performs multiplication.

A third invention is a wireless communication method that performs communication between a transmission device and a reception device that each include a single or a plurality of antennas, the transmission device: performing processing for multiplying a single-carrier signal in which a data signal or a training signal has been formed as a symbol block by a weighting coefficient for separating a signal that is transmitted/received by the antenna or antennas, inserting a guard interval into the single-carrier signal, and transmitting the single-carrier signal from the antenna or antennas; and obtaining information of an impulse response of a communication path from the reception device by transmitting a training signal before starting communication, calculating the weighting coefficient based on the impulse response of the communication path, and determining a modulation and coding method and a length of the guard interval that achieve a maximum throughput in accordance with SINRs in a specific period that are calculated by changing a length of the guard interval, the reception device performing processing for estimating the impulse response of the communication path using a training signal transmitted from the transmission device, and notifying the transmission device of information of the estimated impulse response of the communication path.

A fourth invention is the wireless communication method according to the third invention, wherein the reception device demodulates a reception signal by multiplying a signal obtained by removing the guard interval in a signal received from the transmission device by an entirety or a partial share of the weighting coefficient by which the transmission device side performs multiplication.

A fifth invention includes: a communication unit that performs communication using a single or a plurality of antennas; a modulation unit that generates a single-carrier signal in which a data signal or a training signal has been formed as a symbol block; a guard interval insertion unit that inserts a guard interval into a signal output from the modulation unit and transmits the signal from the communication unit; a weight multiplication unit that performs, between the modulation unit and the guard interval insertion unit, multiplication by a weighting coefficient for separating a signal that is transmitted/received by the antenna or antennas; and a control unit that obtains information of an impulse response of a communication path from a reception device by transmitting a training signal before starting communication, calculates the weighting coefficient based on the impulse response of the communication path, and determines a modulation and coding method and a length of the guard interval that achieve a maximum throughput in accordance with SINRs in a specific period that are calculated by changing a length of the guard interval.

Effects of the Invention

The wireless communication system, the wireless communication method, and the transmission device according to the present invention can perform communication with a selection of the optimal GI length and modulation and coding method that achieve the maximum throughput while suppressing the influence of delay waves in single-carrier communication with formation of symbol blocks that uses time-domain signals.

BRIEF DESCRIPTION OF DRAWINGS

FIG. 5 is a figure showing examples of MCS indexes, bandwidths, and lowest receiving sensitivities.

FIG. 6 is a figure showing examples of MCS indexes, GI lengths, and transmission speeds.

DESCRIPTION OF EMBODIMENTS

The following describes an embodiment of a wireless communication system, a wireless communication method, and a transmission device according to the present invention with reference to the drawings. Note that in the present embodiment, a transmission device and a reception device are referred to as a data transmission station and a data reception station, respectively.

Figure 1:
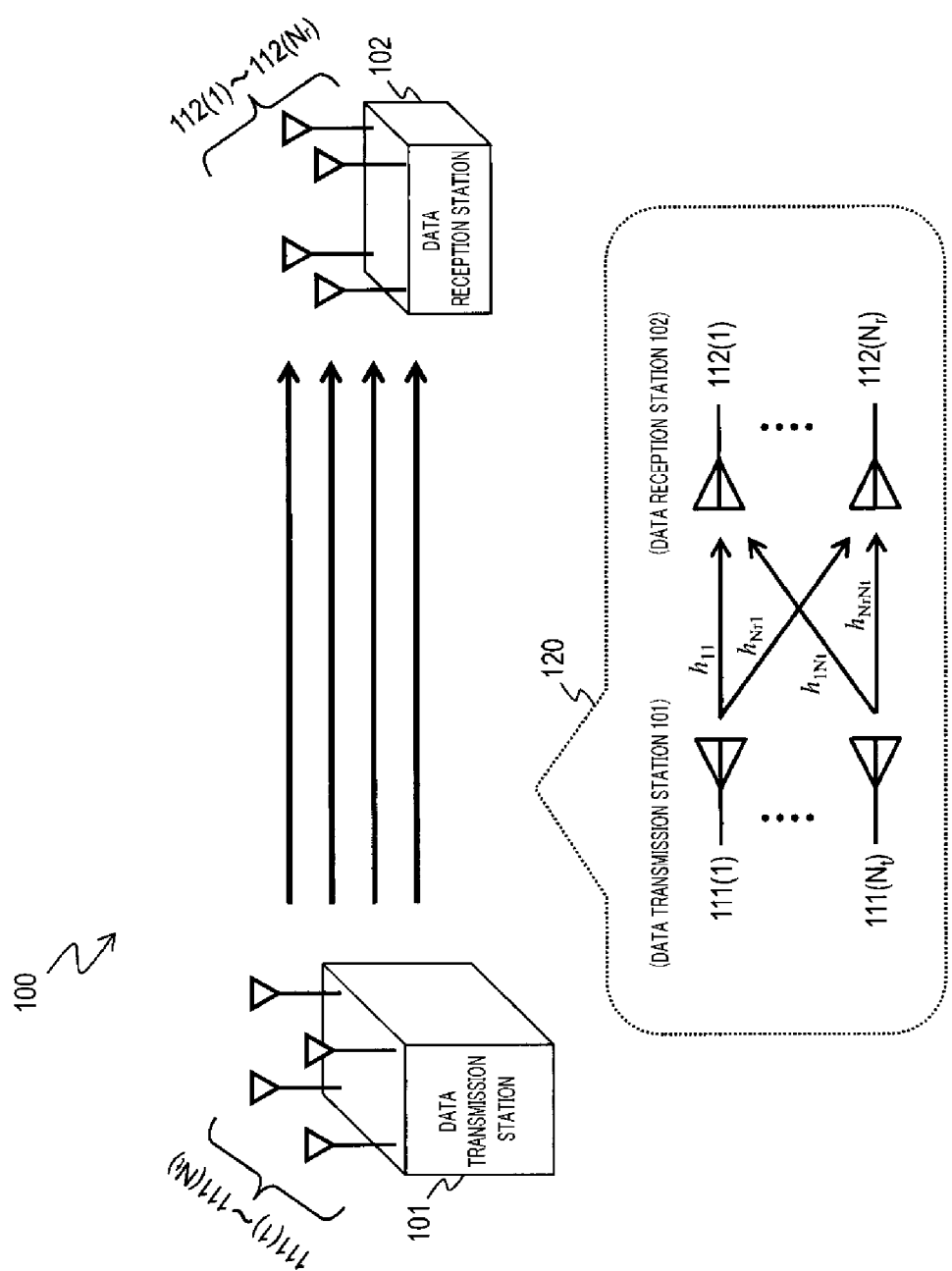
FIG. 1 is a figure showing one example of a wireless communication system according to the present embodiment.

FIG. 1 shows one example of a wireless communication system 100 according to the present embodiment. The wireless communication system 100 includes a data transmission station 101 having a plurality of ($N_t$: an integer, where $N_t \geq 1$) antennas 111(1) to 111($N_t$), and a data reception station 102 having a plurality of ($N_r$: an integer, where $N_r \geq 1$) antennas 112(1) to 112($N_r$). Hereinafter, the antennas 111(1) to 111($N_t$) of the data transmission station 101 are represented as antennas 111 with the omission of (number) at the end of the reference sign in providing a description that is common thereto, and are represented as, for example, antenna 111(1) with the addition of (number) at the end of the reference sign in referring to a specific antenna. Similar representation is also used with respect to the antennas 112(1) to 112($N_r$) of the data reception station 102.

In the wireless communication system 100 according to the present embodiment, the data transmission station 101 and the data reception station 102 perform single-carrier communication with formation of symbol blocks. Here, a plurality of delay waves with different delay times due to multipath and the like exist between the data transmission station 101 and the data reception station 102. In such a delay wave environment, when long delay wave components that exceed the GI length exist, there is a problem that delay waves of an immediately preceding symbol block overlap the next symbol block, leading to the occurrence of distortion caused by interference between symbol blocks. On the other hand, adding a sufficiently long GI for the purpose of avoiding this problem reduces the occurrence of distortion caused by interference between symbol blocks, but gives rise to the problem of reduction in throughput due to increased redundancy.

In view of this, the wireless communication system 100 according to the present embodiment, which performs single-carrier communication with formation of symbol blocks, can perform communication with a selection of a GI length and an MCS index (Modulation and Coding Scheme: an index indicating a combination of a modulation method and a coding rate) that achieve the maximum throughput from among selectable GI lengths and MCS indexes while suppressing distortion caused by interference between symbol blocks in a long delay wave environment.

Here, a balloon section 120 of FIG. 1 shows one example of a communication path matrix H in the case of MIMO (Multiple-Input Multiple-Output) in which the number of the antennas 111 of the data reception station 102 is $N_r$, and the number of the antennas 112 of the data transmission station 101 is $N_t$. In the balloon section 120, the communication path matrix H of MIMO is expressed by an $N_r \times N_t$ impulse response matrix of communication paths as indicated by expression (1). Although the embodiment will be described hereinafter in relation to a case where communication of a MIMO method using a plurality of antennas is performed, application to a case where communication of a SISO (Single-Input Single-Output) method using a single (one) antenna is performed is also possible.

[Formula. 1]

$$H = \begin{bmatrix} h_{11} & \cdots & h_{1N_t} \\ \vdots & \ddots & \vdots \\ h_{N_r1} & \cdots & h_{N_rN_t} \end{bmatrix} \in [N_r \times N_t] \quad (1)$$

Here, in a delay wave environment with a plurality of independent paths having a delay time of a symbol interval, provided that the length of a symbol to be formed as a symbol block is $N_s$, the communication path matrix H indicated by expression (1) turns into an $N_r N_s \times N_t N_s$ impulse response matrix of communication paths, and each element is expressed by $h\_n_r n_t$ indicated by expression (2). Note that in the text, the sign _ denotes a subscript; for example, in $h\_n_r n_t$, $n_r n_t$ denotes a subscript for h. Other expressions and signs that will be described hereinafter will be represented in a similar manner.

[Formula. 2]

$$h_{n_r n_t} = \begin{bmatrix} h_{0,n_r n_t} & \square & \square & \square & 0 \\ \vdots & \ddots & \square & \square & \square \\ h_{L-1,n_r n_t} & \ddots & \ddots & \square & \square \\ \square & \ddots & \ddots & \ddots & \square \\ 0 & \square & h_{L-1,n_r n_t} & \cdots & h_{0,n_r n_t} \end{bmatrix} \in [N_s \times N_s] \quad (2)$$

As described above, the wireless communication system 100 according to the present embodiment is a system that performs single-carrier communication with formation of symbol blocks in a delay wave environment in which a plurality of delay waves exist between the data transmission station 101 and the data reception station 102.

Figure 2:
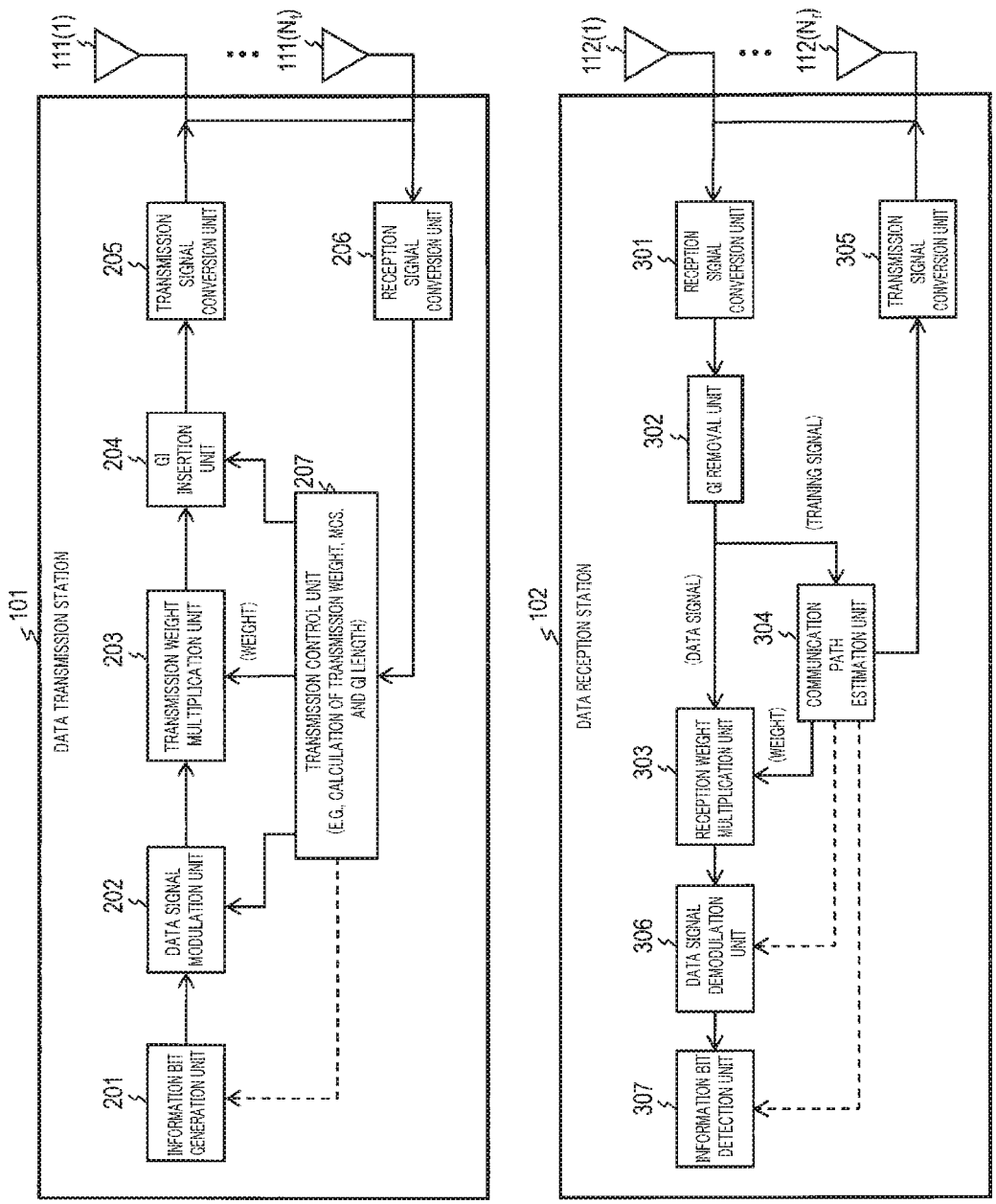
FIG. 2 is a figure showing exemplary configurations of a data transmission station and a data reception station according to the present embodiment.

FIG. 2 shows exemplary configurations of the data transmission station 101 and the data reception station 102 of the wireless communication system 100 according to the present embodiment, which has been described using FIG. 1.

The data transmission station 101 includes an information bit generation unit 201, a data signal modulation unit 202, a transmission weight multiplication unit 203, a GI insertion unit 204, a transmission signal conversion unit 205, a reception signal conversion unit 206, a transmission control unit 207, and the antennas 111.

The data reception station 102 includes a reception signal conversion unit 301, a GI removal unit 302, a reception weight multiplication unit 303, a communication path estimation unit 304, a transmission signal conversion unit 305, a data signal demodulation unit 306, an information bit detection unit 307, and the antennas 112.

First, each component of the data transmission station 101 will be described.

The antennas 111 include a single or a plurality of transmission/reception antennas from the antenna 111(1) to the antenna 111($N_t$), as has been described using FIG. 1, and radiate high-frequency signals output from the transmission signal conversion unit 205, which will be described later, as electromagnetic waves into space. Alternatively, the antennas 111 receive electromagnetic waves in space, including delay waves transmitted from the data reception station 102, and output high-frequency signals.

Under the instruction of the transmission control unit 207, which will be described later, the information bit generation unit 201 generates data information bits to be transmitted to the data reception station 102. The data information bits are a bit string corresponding to, for example, a data signal input from the outside (not shown), a data signal and a training signal generated internally, and the like. The training signal is a signal of information that has been determined in advance, such as a preamble for signal detection (e.g., a specific pattern, such as an alternating pattern of "01"), and is used in level adjustment, frequency offset adjustment, and so on. In the present embodiment, the information bit generation unit 201 generates, for example, an NDP (Null Data Packet) with no data signal as the training signal, which is used on the data reception station 102 side to estimate impulse responses of communication paths. Note that information of the training signal transmitted by the data transmission station 101 is shared with the data reception station 102 in advance. Here, the information bit generation unit 201 may have an error correction coding function of generating an error correction code at a predetermined coding rate, an interleaving function, and the like.

Under the instruction of the transmission control unit 207, which will be described later, the data signal modulation unit 202 modulates the bit string output from the information bit generation unit 201 using a predetermined modulation method (e.g., Quadrature Amplitude Modulation (QAM) and the like).

Here, in the wireless communication system 100 according to the present embodiment, information bits are generated and modulated using a modulation method and a coding rate selected from a plurality of MCS indexes that can be used in the system.

The transmission weight multiplication unit 203 performs weighting for separating signals that are transmitted/received by a single or a plurality of antennas using a transmission weight (weighting coefficient) that has been calculated by the transmission control unit 207, which will be described later, from impulse responses of communication paths estimated by the data reception station 102. Note that various types of signal separation techniques on the transmitting side, including weighting based on ZF (Zero Forcing) or MMSE (Minimum mean square error), eigenmode transmission, and the like may be used in combination with the receiving side. Exemplary calculation of a weight in eigenmode transmission will be described later in detail.

Under the instruction of the transmission control unit 207, which will be described later, the GI insertion unit 204 inserts a GI for reducing the influence of delay waves. A GI is a buffer period that is inserted between neighboring symbols, and the influence of delay waves can be reduced by making this period longer than the delay time of delay waves. For example, the GI insertion unit 204 adds, in front of a symbol period, signals at the end of the symbol period that are equivalent to a GI length to be added.

The transmission signal conversion unit 205 performs frequency conversion of transmission signals with the inserted GI into high-frequency signals to be transmitted from the antennas 111. For example, baseband signals of a 20-MHz band are upconverted into high-frequency signals of a 5-GHz band.

The reception signal conversion unit 206 performs frequency conversion of high-frequency signals received by the antennas 111 into low-frequency baseband signals. For example, the reception signal conversion unit 206 outputs baseband signals of a 20-MHz band by downconverting high-frequency signals of a 5-GHz band.

The transmission control unit 207 controls the operations of the entirety of the data transmission station 101 while calculating a transmission weight, selecting a GI length and an MCS index, and so on. For example, the transmission control unit 207 provides a designation of a training signal and instructions on a modulation method, a coding rate, and the like to the information bit generation unit 201 and the data signal modulation unit 202, and provides an instruction on a GI length to be added to the GI insertion unit 204. The transmission control unit 207 also outputs the calculated transmission weight to the transmission weight multiplication unit 203. Furthermore, before starting main communication with the data reception station 102 (data communication performed between the data transmission station 101 and the data reception station 102), the transmission control unit 207 transmits a training signal to which a GI that is sufficiently longer than expected delay waves has been added. In this way, the data reception station 102 can estimate impulse responses of communication paths, until the end, with high precision. In addition, the transmission control unit 207 receives a notification signal, including communication path information such as the impulse responses of the communication paths, transmitted from the data reception station 102 via the reception signal conversion unit 206. Then, the transmission control unit 207 calculates a transmission weight for separating signals that are transmitted/received by a single or a plurality of antennas from the impulse response of the communication paths estimated by the data reception station 102, and outputs the transmission weight to the transmission weight multiplication unit 203. The transmission control unit 207 further calculates an instantaneous SINR from the received impulse responses of the communication paths. Here, an instantaneous SINR is an SINR in a predetermined period that has been determined in advance, and is calculated on a per-symbol basis, for example. Note that in reality, an average value yielded in units of signal blocks (e.g., 64 symbols) may be used. Then, the transmission control unit 207 repeatedly executes a sequence of processes for calculating throughput using an MCS index selected based on the instantaneous SINR and determining whether the calculated throughput is the maximum throughput while extending the GI length. The transmission control unit 207 ends the processes when the GI length has exceeded the maximum delay of delay waves, or when the selected MCS index has become the largest MCS index that can be used as the system.

In the above-described manner, the data transmission station 101 can select an MCS index and a GI length that achieve the maximum throughput, and start transmission of data signals by setting the selected MCS index and GI length. Note that the methods of calculating an instantaneous SINR and a transmission weight will be described later in detail.

Here, the transmission control unit 207 may select an MCS index and a GI length on a per-antenna basis, or may select the same MCS index and GI length for all antennas.

Furthermore, the selection of an MCS index and a GI length that achieve the maximum throughput and the calculation of a transmission weight may be performed on the data reception station 102 side. In this case, the transmission control unit 207 configures settings by receiving a notification signal, including information of an MCS index and a GI length that achieve the maximum throughput and a transmission weight, from the data reception station 102.

Next, each component of the data reception station 102 shown in FIG. 2 will be described.

The antennas 112 include a single or a plurality of transmission/reception antennas from the antenna 112(1) to the antenna 112($N_r$), as has been described using FIG. 1, and radiate high-frequency signals output from the transmission signal conversion unit 305, which will be described later, as electromagnetic waves into space. Alternatively, the antennas 112 convert electromagnetic waves in space, including delay waves transmitted from the data transmission station 101, into high-frequency signals.

Similarly to the reception signal conversion unit 206 of the data transmission station 101, the reception signal conversion unit 301 performs frequency conversion of high-frequency signals received by the antennas 112 into baseband signals.

The GI removal unit 302 removes a GI that has been inserted on the data transmission station 101 side, and then outputs data signals (a training signal in a training period) from which the GI has been removed.

The reception weight multiplication unit 303 performs weighting for separating signals that are transmitted/received by a single or a plurality of antennas by multiplying the data signals, from which the GI has been removed by the removal unit 302, by a reception weight (weighting coefficient). Here, the reception weight is calculated from impulse responses of communication paths that have been estimated by the communication path estimation unit 304, which will be described later. Note that similarly to the transmission weight multiplication unit 203 of the data transmission station 101, various types of signal separation techniques, including weighting based on ZF or MMSE, eigenmode transmission, and the like may be used in combination. Furthermore, the calculation and multiplication of a weight may be performed only on the data transmission station 101 side, or may be performed only on the data reception station 102 side. Alternatively, the data transmission station 101 and the data reception station 102 may perform the calculation and multiplication of respective weights thereof. Note that in the wireless communication system 100 according to the present embodiment, both of the data transmission station 101 and the data reception station 102 perform the calculation and multiplication of a weight.

The communication path estimation unit 304 estimates impulse responses of communication paths from a known training signal that is output from the GI removal unit 302 and has been determined in advance. In the present embodiment, as has been described in relation to the data transmission station 101 side, the communication path estimation unit 304 accurately estimates impulse responses of communication paths until the end using an NDP transmitted from the data transmission station 101. Then, the communication path estimation unit 304 generates a notification signal including information of the estimated impulse responses of the communication paths, and transmits the notification signal to the data transmission station 101 from the transmission signal conversion unit 305 and the antennas 112.

Similarly to the transmission signal conversion unit 205 of the data transmission station 101, the transmission signal conversion unit 305 converts baseband signals into high-frequency signals and transmits the high-frequency signals from the antennas 111.

Under the instruction of the communication path estimation unit 304, the data signal demodulation unit 306 performs demodulation for detecting data signals modulated on the data transmission station 101 side as information bits, and outputs a bit string. Note that the data signal demodulation unit 306 has an error correction decoding function and a deinterleaving function in correspondence with the functions on the data transmission station 101 side. Here, the data signal demodulation unit 306 may yield a Log-Likelihood Ratio (LLR) as an input value of error correction decoding based on an instantaneous SINR. In this case, information of the instantaneous SINR is calculated by the communication path estimation unit 304 and output to the data signal demodulation unit 306.

Under the instruction of the communication path estimation unit 304, the information bit detection unit 307 detects necessary information bits from the bit string output from the data signal demodulation unit 306. Note that the error correction decoding function and the deinterleaving function may be implemented on the information bit detection unit 307 side.

In the above-described manner, the data reception station 102 accurately estimates impulse responses of communication paths until the end from a training signal transmitted from the data transmission station 101, and notifies the data transmission station 101 of the estimated impulse responses of the communication paths.

Although the present embodiment has been described using a case where the selection of an MCS index and a GI length that achieve the maximum throughput is performed by the data transmission station 101, this selection may be performed on the data reception station 102 side. In this case, for example, the communication path estimation unit 304 calculates an instantaneous SINR and throughput based on the estimated impulse responses of the communication paths, selects an MCS index and a GI length that achieve the maximum throughput, and notifies the data transmission station 101 side of the selected MCS index and GI length.

Here, as the communication path estimation unit 304 controls the entirety of the data reception station 102, including provision of instructions on, for example, a modulation method and a coding rate to the data signal demodulation unit 306 and the information bit detection unit 307, calculation and setting of a reception weight for the reception weight multiplication unit 303, and so on, the communication path estimation unit 304 may be referred to as a reception control unit 304 similarly to the transmission control unit 207 of the data transmission station 101.

As has been described above using FIG. 2, the wireless communication system 100 according to the present embodiment accurately estimates impulse responses of communication paths until the end prior to main communication, performs weighting by calculating a weight for signal separation, yields an instantaneous SINR from the results of estimation of the impulse responses, and selects a GI length and an MCS index that achieve the maximum throughput from selectable combinations of GI lengths and MCS indexes. As a result, in the wireless communication system 100 that performs single-carrier communication with formation of symbol blocks, communication can be performed with a selection of a GI length and an MCS index that achieve the maximum throughput while suppressing distortion caused by interference between symbol blocks in a long delay wave environment.

[GI Addition/Removal Operation]

The following provides a detailed description of a GI addition/removal operation for the case of an environment with delay waves that do not exceed the GI length and for the case of an environment with delay waves that exceed the GI length.

(Case of Environment with Delay Waves That Do Not Exceed GI Length)

Figure 3:
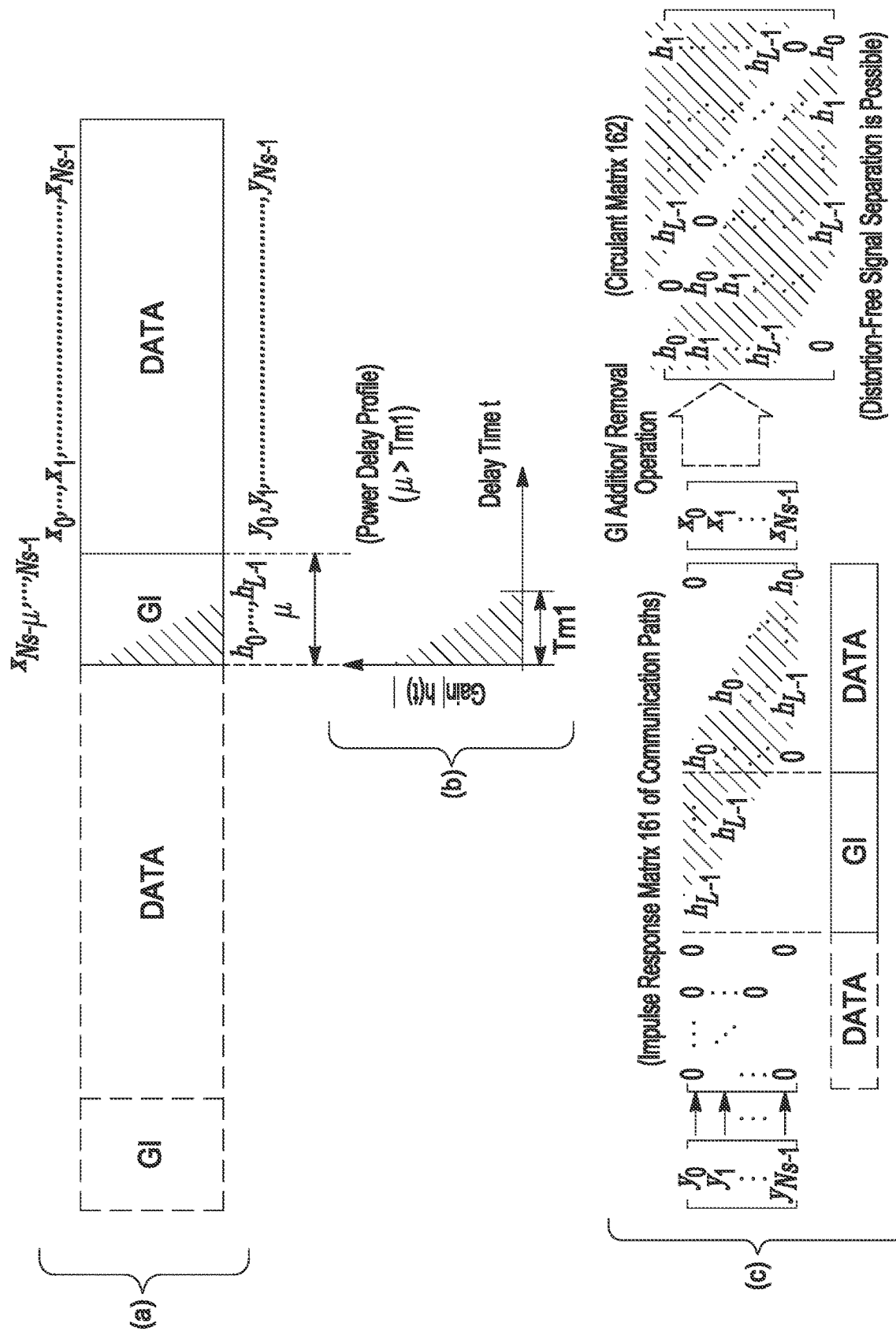
FIG. 3 is a figure showing one example of a GI addition/removal operation for the case where the delay time of delay waves is shorter than a GI length.

FIG. 3 shows one example of the GI addition/removal operation for the case where the delay time of delay waves is shorter than the GI length. In an environment with delay waves that do not exceed the GI length, distortion-free signal separation is possible, and thus communication can be performed while suppressing interference between symbol blocks.

FIG. 3(*a*) shows a single-carrier frame 151 formed as a symbol block, in which a GI 152 of a μ symbol length is added to a DATA field (data period). Note that in FIG. 3(*a*), $h_0, \ldots, h_{L-1}$ denote impulse responses, $x_0, x_1 \ldots x_{N\_s-1}$ denote transmission signals, and $y_0, y_1 \ldots y_{N\_s-1}$ denote reception signals. Here, the end portion of the DATA field having a length equivalent to the GI length $(x_{N\_s-\mu} \ldots x_{N\_s-1})$ is added in a GI period. Note that $x_{N\_s-\mu}$ denotes a transmission signal that is located the μ symbol length from the last transmission signal $x_{N\_s-1}$ of the DATA field.

FIG. 3(*b*) shows one example of a power delay profile 153 in the environment with delay waves that do not exceed the GI length; a horizontal axis represents delay time t, and a vertical axis represents gain |h(t)|. Here, provided that the maximum delay time of the power delay profile 153 is Tm1 and the GI length of the frame 151 is μ symbol, when the relationship μ>Tm1 is satisfied, delay waves (a portion with oblique lines in the GI 152 of FIG. 3(*a*)) fall within the time of the μ symbol GI length, and thus there is no influence on the DATA field.

FIG. 3(*c*) shows an impulse response matrix 161 of communication paths; after the GI addition/removal operation is performed, the matrix turns into a complete circulant matrix 162, and distortion-free signal separation is possible.

(Case of Environment with Delay Waves That Exceed GI Length)

Figure 4:
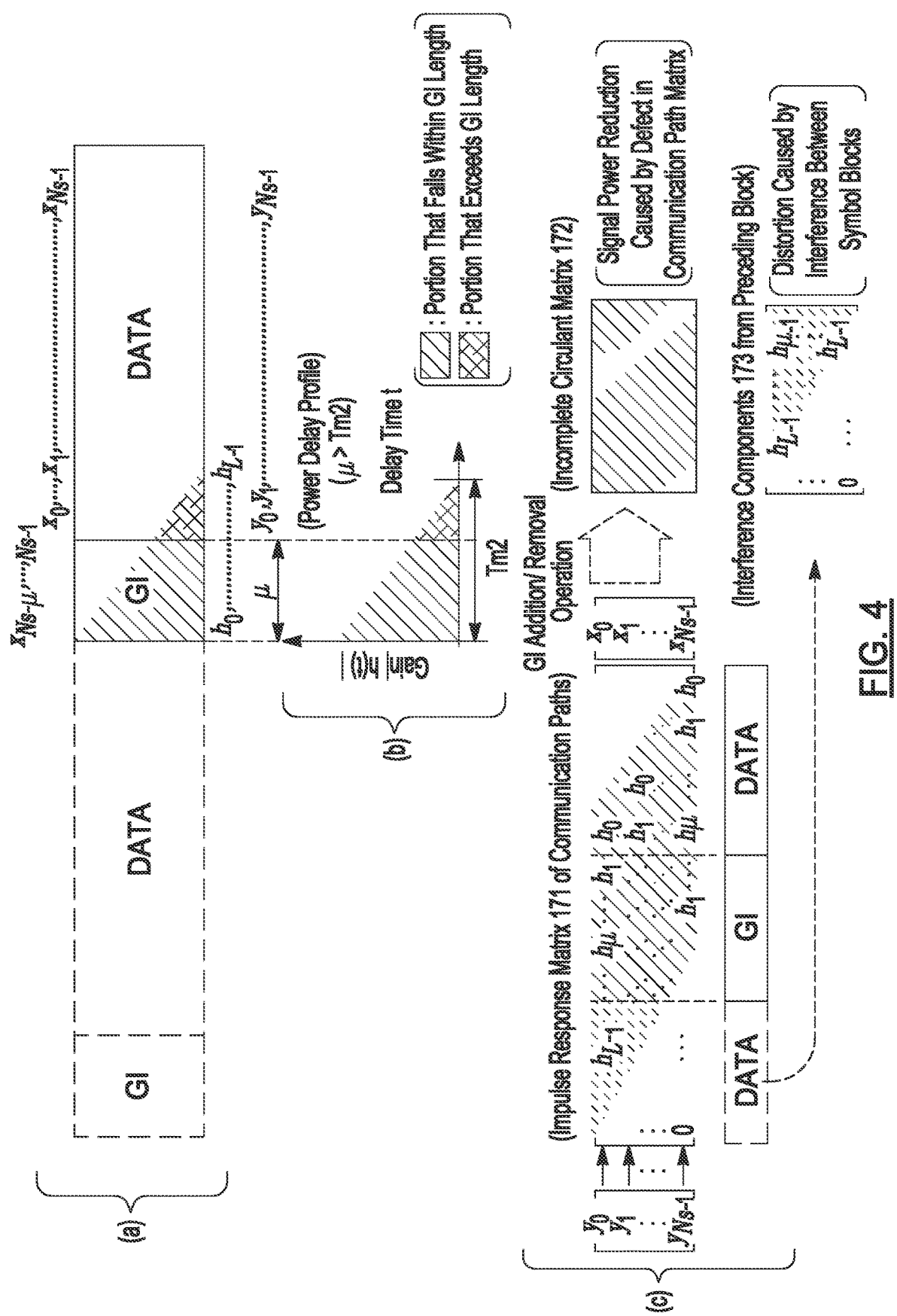
FIG. 4 is a figure showing one example of a GI addition/removal operation for the case where the delay time of delay waves is longer than a GI length.

FIG. 4 shows one example of the GI addition/removal operation for the case where the delay time of delay waves is longer than the GI length.

Similarly to FIG. 3(*a*), FIG. 4(*a*) shows a single-carrier frame 151 formed as a symbol block, in which a GI 152 of a μ symbol length is added to a DATA field. Note that the difference from FIG. 3(*a*) is that, as the delay time of delay waves is longer than the GI length, impulse responses $h_0, \ldots, h_{L-1}$ exceed the GI period of the μ symbol length and enter the period of the DATA field, and reception signals $y_0, y_1 \ldots y_{N\_s-1}$ are influenced by an immediately preceding symbol block.

FIG. 4(*b*) shows one example of a power delay profile in the environment with delay waves that exceed the GI length; a horizontal axis represents delay time t, and a vertical axis represents gain |h(t)|. Here, provided that the maximum delay time of the power delay profile 154 is Tm2 and the GI length of the frame 151 is μ symbol, the relationship μ<Tm2 is satisfied, and among delay waves (a portion of the impulse responses $h_0, \ldots, h_{L-1}$ in FIG. 4(*a*)), a portion indicated by oblique lines falls within the time of the μ symbol GI length, but a portion indicated by crossed lines overlaps the DATA field.

FIG. 4(c) shows an impulse response matrix 171 of communication paths; after the GI addition/removal operation is performed, the matrix turns into an incomplete circulant matrix 172, and signal power is reduced due to a defect in the communication path matrix. Furthermore, interference components 173 from the immediately preceding symbol block give rise to the occurrence of distortion caused by interference between symbol blocks.

As described above, when delay wave components that exceed the GI length exist, a matrix indicating impulse responses of communication paths communication path matrix) within the current symbol block does not turn into a circulant matrix. This gives rise to the problem of reduction in signal power, and to the problem that delay wave components of the immediately preceding symbol block influence the next symbol block.

(GI Addition Operation on Data Transmission Station 101 Side)

Next, the operation of adding a GI on the data transmission station 101 side will be described. Now, in order to simplify the description, consider signals that are transmitted from the $n_t^{th}$ antenna 111 of the data transmission station 101 and received by the $n_r^{th}$ antenna 112 of the data reception station 102. Note that while a frame that is transmitted/received between the data transmission station 101 and the data reception station 102 is the same as the frame 151 that has been described using FIG. 3 and FIG. 4, impulse responses are represented as $h_{0, n\_r n\_t}$, . . . , $h_{L-1, n\_r n\_t}$, transmission signal blocks are represented as $x_{0, n\_t}, x_{1, n\_t} \cdots x_{N\_s-1, n\_t}$, and reception signal blocks are represented as $y_{0, n\_r}, y_{1, n\_r} \cdots y_{N\_s-1, n\_r}$.

Hereinafter, each sign is defined as follows.
$y_n$: reception signal block
$x_n$: transmission signal block
$x^I_n$: immediately preceding block transmission signal
$h_n$: impulse response of communication path
$w_n$: added noise
$x'_n$: transmission signal block after addition of GI
$y'_n$: reception signal block before removal of GI Also, a transmission signal block $x_n$ transmitted from the data transmission station 101 can be expressed by expression (3).

[Formula. 3]

$$x_n = \begin{bmatrix} x_{0,n_t} \\ \vdots \\ \vdots \\ x_{N_s-1,n_t} \end{bmatrix} \in [N_s \times 1] \qquad (3)$$

Furthermore, in a case where the data transmission station 101 side adds a GI of a μ symbol length, the GI addition operation is expressed by a matrix $T_{CP}$ indicated by expression (4).

[Formula. 4]

$$T_{CP} = \begin{bmatrix} 0_{\mu \times (N_s-\mu)} & I_{\mu \times \mu} \\ I_{N_s \times N_s} & \end{bmatrix} \in [(N_s + \mu) \times N_s] \qquad (4)$$

Then, using the GI addition matrix $T_{CP}$ indicated by expression (4), the transmission signal block $x_n$ before addition of the GI indicated by expression (3) is converted into a transmission signal block $x'_n$ after addition of the GI as indicated by expression (5).

[Formula. 5]

$$x'_n = T_{CP} x_n = \begin{bmatrix} x_{N_s-\mu,n_t} \\ \vdots \\ x_{N_s-1,n_t} \\ x_{0,n_t} \\ \vdots \\ x_{N_s-1,n_t} \end{bmatrix} \in [(N_s + \mu) \times 1] \qquad (5)$$

(GI Removal Operation on Data Reception Station 102 Side)

Next, on the data reception station 102 side, a reception signal block $y'_n$ before GI removal is expressed by expression (6).

[Formula. 6]

$$y'_n = h_{n_r,n_t} x'_n + h^I_{n_r,n_t} x^I_n + w_n \qquad (6)$$

Here, in expression (6), the first term denotes reception signals of the current symbol, the second term denotes reception signals of an immediately preceding symbol, and the third term denotes added noise.

In expression (6), the impulse response matrix of communication paths, $h\_n_r n_t$, is expressed by expression (7).

[Formula. 7]

$$h_{n_r,n_t} = \begin{bmatrix} h_{0,n_r n_t} & \square & \square & \square & 0 \\ \vdots & \ddots & \square & \square & \square \\ h_{L-1,n_r n_t} & \ddots & \ddots & \square & \square \\ \square & \ddots & \ddots & \ddots & \square \\ 0 & \square & h_{L-1,n_r n_t} & \cdots & h_{0,n_r n_t} \end{bmatrix} \in [(N_s \times \mu) \times (N_s + \mu)] \qquad (7)$$

Also, the impulse response matrix of communication paths, $h'\_n_r n_t$, of an immediately preceding block is expressed by expression (8).

[Formula. 8]

$$h^1_{n_r n_t} = \begin{bmatrix} \square & h^1_{L-1,n_r n_t} & \cdots & h^1_{1,n_r n_t} \\ \square & \square & \ddots & \vdots \\ \square & \square & \square & h^1_{L-1,n_r n_t} \\ 0 & \square & \square & \square \end{bmatrix} \in [(N_s + \mu) \times (N_s + \mu)] \qquad (8)$$

Now, in order to simplify the description of the data reception station 102 side, consider signals that are transmitted from the $n_t^{th}$ transmission antenna of the data transmission station 101 and then received by the $n_r^{th}$ reception antenna of the data reception station 102.

Using a matrix $R_{CP}$ indicated by expression (9) for removing the GI of the μ symbol length, the GI is removed from the reception signal block $y'_n$ before GI removal in expression (6), and then a reception signal block $y_n$ after GI removal indicated by expression (10) is obtained.

[Formula. 9]

$$R_{CP} = [0_{N_s} \times \mu I_{N_s} \times N_s] \in [N_s \times (N_s + \mu)] \quad (9)$$

[Formula. 10]

$$y_n = R_{CP} h_{n_r,n_t} T_{CP} x_n + R_{CP} h_{n_r,n_t}{}^I T_{CP} x_n{}^I + w_n \in [N_s \times 1] \quad (10)$$

Here, performing the computation "$R_{CP} H T_{CP}$" of multiplying the GI addition matrix ($T_{CP}$) by the GI removal matrix ($R_{CP}$) is referred to as the "GI addition/removal operation".

For example, as the communication path matrix H is expressed by expression (11), performing the GI addition/removal operation is expressed by expression (12).

[Formula. 11]

$$H = \begin{bmatrix} h_0 & \square & \square & \square & 0 \\ \vdots & \ddots & \square & \square & \square \\ h_{L-1} & \ddots & \ddots & \square & \square \\ \square & \ddots & \ddots & \ddots & \square \\ 0 & \square & h_{L-1} & \cdots & h_0 \end{bmatrix} \quad (11)$$

[Formula. 12]

$$R_{CP} H T_{CP} = \begin{bmatrix} h_0 & 0 & h_{L-1} & \cdots & \cdots & h_1 \\ h_1 & h_0 & 0 & \ddots & \ddots & \vdots \\ \vdots & h_1 & \ddots & \square & \ddots & \vdots \\ h_{L-1} & \ddots & \ddots & \ddots & \square & h_{L-1} \\ \square & \ddots & \ddots & \ddots & \ddots & 0 \\ 0 & \square & h_{L-1} & \cdots & h_1 & h_0 \end{bmatrix} \quad (12)$$

The GI addition/removal operation is performed in the above-described manner. Note that expression (12) is a complete circulant matrix when the GI addition/removal operation is performed in the environment with long delay waves that do not exceed the GI length as has been described using FIG. 3, but is an incomplete circulant matrix when the GI addition/removal operation is performed in the environment with long delay waves that exceed the GI length as has been described using FIG. 4.

The following provides a detailed description of signals that are transmitted from the $n_t^{th}$ antenna 111 ($n_t$) of the data transmission station 101 and received by the $n_r^{th}$ antenna 112 ($n_r$) of the data reception station 102 in the environment with long delay waves that exceed the GI length, which has been described using FIG. 4.

A reception signal block $y\_n_r$ of the antenna 112 ($n_r$) before performing the GI addition/removal operation is expressed by expression (13).

[Formula. 13]

$$y_{n_r} = \begin{bmatrix} y_{0,n_r} \\ y_{1,n_r} \\ \vdots \\ y_{N_s-1,n_r} \end{bmatrix} = \begin{bmatrix} h_{0,n_r,n_t} & \square & \square & \square & 0 \\ \vdots & \ddots & \square & \square & \square \\ h_{L-1,n_r,n_t} & \ddots & \ddots & \square & \square \\ \square & \ddots & \ddots & \ddots & \square \\ 0 & \square & h_{L-1,n_r,n_t} & \cdots & h_{0,n_r,n_t} \end{bmatrix} \begin{bmatrix} x_{0,n_t} \\ \vdots \\ \vdots \\ x_{N_s-1,n_t} \end{bmatrix} + \begin{bmatrix} \square & h_{L-1,n_r,n_t} & \cdots & h_{1,n_r,n_t} \\ \square & \square & \ddots & \vdots \\ \square & \square & \square & h_{L-1,n_r,n_t} \\ 0 & \square & \square & \square \end{bmatrix} \begin{bmatrix} x^1_{0,n_t} \\ \vdots \\ \vdots \\ x^1_{N_s-1,n_t} \end{bmatrix} + \begin{bmatrix} w_{0,n_r} \\ \vdots \\ \vdots \\ w_{N_s-1,n_r} \end{bmatrix} \quad (13)$$

Here, in expression (13), the first term denotes reception signals of the current symbol, the second term denotes reception signals of an immediately preceding symbol, and the third term denotes added noise.

Then, after the GI addition/removal operation is performed, the reception signal block $y\_n_r$ is expressed by expression (14).

[Formula. 14]

$$y_{n_r} = \begin{bmatrix} y_{0,n_r} \\ y_{1,n_r} \\ \vdots \\ y_{N_s-1,n_r} \end{bmatrix} = \begin{bmatrix} h_{0,n_r,n_t} & \square & 0 & \square & h_{\mu,n_r,n_t} & \cdots & h_{1,n_r,n_t} \\ \vdots & \ddots & \square & \square & \vdots & \ddots & \vdots \\ \vdots & \ddots & \ddots & \square & h_{L-1,n_r,n_t} & \ddots & \vdots \\ \vdots & \ddots & \ddots & \ddots & \square & \ddots & \vdots \\ h_{L-1,n_r,n_t} & \ddots & \ddots & \ddots & \ddots & \square & h_{L-1,n_r,n_t} \\ \square & \ddots & \ddots & \ddots & \ddots & \ddots & \square \\ 0 & \square & h_{L-1,n_r,n_t} & \cdots & \cdots & \cdots & h_{0,n_r,n_t} \end{bmatrix} \begin{bmatrix} x_{0,n_t} \\ \vdots \\ \vdots \\ x_{N_s-1,n_t} \end{bmatrix} + \begin{bmatrix} \square & h_{L-1,n_r,n_t} & \cdots & h_{1,n_r,n_t} \\ \square & \square & \ddots & \vdots \\ \square & \square & \square & h_{L-1,n_r,n_t} \\ 0 & \square & \square & \square \end{bmatrix} \begin{bmatrix} x^1_{0,n_t} \\ \vdots \\ \vdots \\ x^1_{N_s-1,n_t} \end{bmatrix} + \begin{bmatrix} w_{0,n_r} \\ \vdots \\ \vdots \\ w_{N_s-1,n_r} \end{bmatrix} \quad (14)$$

Here, in expression (14), the first term denotes reception signals of the current symbol, the second term denotes reception signals of the immediately preceding symbol, and the third term denotes added noise. As indicated by expression (14), as a communication path matrix of the reception signals of the current symbol in the first term is an incomplete circulant matrix with a partial defect, signal power is reduced. The reception signals of the immediately preceding symbol in the second term contain a communication path matrix of the defect portion, thereby giving rise to distortion caused by interference between symbol blocks.

As described above, when delay wave components that exceed the GI length exist, signal power of the current symbol block is reduced, giving rise to distortion caused by the immediately preceding symbol block.

[Embodiment Using Eigenmode Transmission]

Next, a description is given of an embodiment that uses eigenmode transmission with respect to communication paths for which a circulant matrix has been achieved in the wireless communication system 100 according to the present embodiment.

The eigenmode transmission is one of methods of performing signal separation by applying an operation called singular value decomposition to an impulse response matrix of communication paths. Here, signal separation is processing for separating signals that are received in a state where signals transmitted from a single or a plurality of transmission antennas 111 are mixed due to the inter-antenna influence, the influence of delay waves, and the like.

Here, for example, the singular value decomposition is applied to a communication path matrix H of the case of MIMO communication indicated by expression (15). Note that description is given here of the case where communication of a MIMO method is performed; in the case of communication of a SISO method, application is possible using H=[$h_{11}$] as expression (15).

[Formula. 15]

$$H = \begin{bmatrix} h_{11} & \cdots & h_{1N_t} \\ \vdots & \ddots & \vdots \\ h_{N_r1} & \cdots & h_{N_rN_t} \end{bmatrix} \in [N_r \times N_t] \quad (15)$$

In this case, expression (15) can be expressed as expression (16).

[Formula. 16]

$$H = U\Sigma V^H \quad (16)$$
$$(V, U \in [N_r \times N_t], \Sigma \in [N_r \times N_t])$$

Here, V, U denote a unitary matrix, and $V^H$ denotes a matrix obtained as a result of the complex conjugate transpose of V.

Also, $\Sigma$ is expressed by expression (17). Here, $\lambda_n$ ($\lambda_1$ to $\lambda_N$) denotes instantaneous signal power.

[Formula. 17]

$$\Sigma = \begin{bmatrix} \sqrt{\lambda_1} & \square & 0 \\ \square & \ddots & \square \\ 0 & \square & \sqrt{\lambda_N} \end{bmatrix} \in [N_r \times N_t] \quad (17)$$
$$(N = \min[N_r, N_t])$$

Therefore, by performing the multiplication using V and $U^H$ as weighting coefficients on the transmission side and the reception side, respectively, signal separation can be performed as indicated by expression (18). Here, W denotes added noise.

[Formula. 18]

$$Y = U^H y = U^H U\Sigma V^H Vx + W = \Sigma x + W \quad (18)$$

Note that V is equivalent to the transmission weight that is used by the transmission weight multiplication unit 203 in the multiplication, and $U^H$ is equivalent to the reception weight that is used by the reception weight multiplication unit 303 in the multiplication.

Furthermore, although signal separation is performed using weight multiplication on each of the data transmission station 101 side and the data reception station 102 side in the present embodiment, multiplication may be performed using both of the transmission weight and the reception weight on the data transmission station 101 side without performing multiplication using the reception weight on the data reception station 102 side. Conversely, multiplication may be performed using both of the transmission weight and the reception weight on the data reception station 102 side without performing multiplication using the transmission weight on the data transmission station 101 side.

Here, general singular value decomposition is applied to a communication path matrix H of expression (19).

[Formula. 19]

$$H \in [N_r \times N_t] \quad (19)$$

On the other hand, in the wireless communication system 100 according to the present embodiment, as signals are formed as symbol blocks, singular value decomposition is applied to a communication path matrix H of expression (20).

[Formula. 20]

$$H \in [N_r N_s \times N_t N_s] \quad (20)$$

Next, when the eigenmode transmission method is used, reception signals Y are expressed by expression (21) using a communication path matrix before a defect arises in the communication path matrix due to delay waves longer than the GI length, the defect portion of the communication path matrix, and interference components from an immediately preceding symbol block.

[Formula. 21]

$$Y = U^H y = U^H \tilde{H} Vx - U^H H^0 Vx + U^H H^1 Vx^1 + W = \Sigma x - U^H H^0 Vx + U^H H^1 Vx^1 + W \quad (21)$$

Here, in expression (21), the first term denotes a communication path matrix before the defect, the second term denotes a communication path matrix of the defect portion, the third term denotes a communication path matrix of an interference portion from the immediately preceding symbol block, and the fourth term denotes added noise.

(1) Communication Path Matrix before Defect

First, the communication path matrix H˜ before the defect (˜ is a tilde sign placed above H) is expressed by expression (22).

[Formula. 22]

$$\tilde{H} = \begin{bmatrix} h_{11} & \cdots & h_{1N_t} \\ \vdots & \ddots & \vdots \\ h_{N_r1} & \cdots & h_{N_rN_t} \end{bmatrix} \in [N_r N_s \times N_t N_s] \quad (22)$$

At this time, impulse responses $h\_n_r n_t$ of the communication path matrix H˜ before the defect are expressed by expression (23).

[Formula. 23]

$$h_{n_r n_t} = \begin{bmatrix} h_{0,n_r n_t} & 0 & h_{L-1,n_r n_t} & \cdots & h_{1,n_r n_t} \\ \vdots & \ddots & \square & \ddots & \vdots \\ h_{L-1,n_r n_t} & \ddots & \ddots & \square & h_{L-1,n_r n_t} \\ \square & \ddots & \ddots & \ddots & 0 \\ 0 & \square & h_{L-1,n_r n_t} & \cdots & h_{0,n_r n_t} \end{bmatrix} \in [N_s \times N_s] \quad (23)$$

Then, using the singular value decomposition, the communication path matrix H˜ before the defect is calculated as in expression (24).

[Formula. 24]

$$\tilde{H} = U\Sigma V^H \quad (24)$$

Here, $\Sigma$ is expressed by expression (25).

[Formula. 25]

$$\Sigma = \begin{bmatrix} \sqrt{\lambda_1} & \square & 0 \\ \square & \ddots & \square \\ 0 & \square & \sqrt{\lambda_N} \end{bmatrix} \in [N_r N_s \times N_t N_s] \quad (25)$$

$(N = \min[N_r N_s, N_t N_s])$ (2) Communication Path Matrix of Defect Portion

Next, the communication path matrix $H^0$ of the defect portion is expressed by expression (26).

[Formula. 26]

$$H^0 = \begin{bmatrix} h^0_{11} & \cdots & h^0_{1N_t} \\ \vdots & \ddots & \vdots \\ h^0_{N_r 1} & \cdots & h^0_{N_r N_t} \end{bmatrix} \in [N_r N_s \times N_t N_s] \quad (26)$$

At this time, impulse responses $h^0\_n_r n_t$ of the communication path matrix $H^0$ of the defect portion are expressed by expression (27).

[Formula. 27]

$$h^0_{n_r n_t} = \begin{bmatrix} \square & h^0_{L-1} & \cdots & h^0_{\mu+1} & 0 & \cdots & 0 \\ \square & \square & \ddots & \vdots & \square & \square & \square \\ \square & \square & \square & h^0_{L-1} & \square & \square & \square \\ 0 & \square & \square & \square & \square & \square & \square \end{bmatrix} \in [N_s \times N_s] \quad (27)$$

Note that in expression (27), the length of the rear portion 0 . . . 0 corresponds to the GI length $\mu$.

(3) Communication Path Matrix of Interference Portion from Immediately Preceding Symbol Block Next, the communication path matrix $H^I$ of the interference portion from the immediately preceding symbol block is expressed by expression (28).

[Formula. 28]

$$H^I = \begin{bmatrix} h^I_{11} & \cdots & h^I_{1N_t} \\ \vdots & \ddots & \vdots \\ h^I_{N_r 1} & \cdots & h^I_{N_r N_t} \end{bmatrix} \in [N_r N_s \times N_t N_s] \quad (28)$$

At this time, impulse responses $h^I\_n_r n_t$ of the communication path matrix $H^I$ of the interference portion from the immediately preceding symbol block are expressed by expression (29).

[Formula. 29]

$$h^I_{n_r n_t} = \begin{bmatrix} \square & h^I_{L-1} & \cdots & h^I_{\mu+1} \\ \square & \square & \ddots & \vdots \\ \square & \square & \square & h^I_{L-1} \\ 0 & \square & \square & \square \end{bmatrix} \in [N_s \times N_s] \quad (29)$$

The communication path matrix $\tilde{H}$ before the defect, the communication path matrix $H^0$ of the defect portion, and the communication path matrix $H^I$ of the interference portion from the immediately preceding symbol block are each represented in the above-described manner.

(Calculation of Instantaneous SINR)

Next, a description is given of a method of calculating an instantaneous SINR. Here, the $n^{th}$ reception symbol block $Y_n$ is expressed by expression (30).

[Formula. 30]

$$Y_n = \sqrt{\lambda_n}\, x_n + \left( -\sum_{k=0}^{N_t N_s - 1} a_{n,k} x_n + \sum_{k=0}^{N_t N_s - 1} a_{n,k} x_n \right) + w_n \quad (30)$$

Here, in expression (30) the first term denotes communication path matrix before the defect, the second term denotes the communication path matrix of the defect portion, the third term denotes the communication path matrix of the interference portion from the immediately preceding symbol block, and the fourth term denotes added noise.

Provided that the sum of the power of the defect portion and the power of the interference portion from the immediately preceding symbol block is instantaneous interference power $P_I$ in expression (30), the instantaneous interference power $P_I$ is expressed by expression (31).

[Formula. 31]

$$P_1 = E\left[ \left| -\sum_{k=0}^{N_t N_s - 1} a_{n,k} x_n + \sum_{k=0}^{N_t N_s - 1} a_{n,k} x_n \right|^2 \right] = \sum_{k=0}^{N_t N_s - 1} |a_{n,k}|^2 + \sum_{k=0}^{N_t N_s - 1} |b_{n,k}|^2 \quad (31)$$

where $E[|x_n|^2] = E[|X_n|^2] = 1$ is assumed.

In expression (31), $x_n$ denotes the $n^{th}$ transmission symbol, and $X_n$ denotes a transmission symbol block. Also, $E[\bullet]$ denotes an expected value, $E[|x_n|^2]$ denotes the average energy in one symbol, and $E[|X_n|^2]$ denotes the average energy in a symbol block.

As described above, the instantaneous interference power $P_I$ is equivalent to the sum of squares of a coefficient a of signal components of the defect portion, and the sum of squares of a coefficient b of interference components from the immediately preceding symbol block.

Note that the power $P_a$ of the defect portion is expressed by expression (32), and the power $P_b$ of the interference portion from the immediately preceding symbol block is expressed by expression (33). At this time, the instantaneous interference power $P_I = P_a + P_b$.

[Formula. 32]

$$P_a = U^H H^0 V = \begin{bmatrix} a_{11} & \cdots & a_{1, N_t N_s - 1} \\ \vdots & \ddots & \vdots \\ a_{N_r N_s - 1, 1} & \cdots & a_{N_r N_s - 1, N_t N_s - 1} \end{bmatrix} \quad (32)$$

[Formula. 33]

$$P_b = U^H H^1 V = \begin{bmatrix} b_{11} & \cdots & b_{1, N_t N_s - 1} \\ \vdots & \ddots & \vdots \\ b_{N_r N_s - 1, 1} & \cdots & b_{N_r N_s - 1, N_t N_s - 1} \end{bmatrix} \quad (33)$$

Furthermore, provided that the instantaneous SINR, the instantaneous signal power, and the instantaneous noise power are represented as iSINR(n), $\lambda_n$, and $\sigma^2$, respectively, iSINR(n) is expressed by expression (34).

[Formula. 34]

$$iSINR(n) = \frac{\lambda_n}{\sum_{k=0}^{N_t N_s - 1} |a_{n,k}|^2 + \sum_{k=0}^{N_t N_s - 1} |b_{n,k}|^2 + \sigma^2} \quad (34)$$

In the above-described manner, the instantaneous SINR can be yielded from the power of the defect portion and the power of the interference portion from the immediately preceding symbol block.

In the foregoing description, the instantaneous SINR is calculated by iSINR=$\lambda$/(Pa+Pb+$\sigma$2) based on the signal power of the defect portion caused by delay waves (Pa), the power of the interference portion from the immediately preceding symbol block (Pb), the power of added noise ($\sigma$2), and the signal power before the defect caused by delay waves ($\lambda$); however, the signal power corresponding to the defect caused by delay waves may be subtracted from the instantaneous signal power in advance, rather than being calculated as the interference portion. In this case, provided that the instantaneous signal power is represented as $\lambda$' after the subtraction of the signal power corresponding to the defect caused by delay waves, the instantaneous SINR can be yielded by iSINR=$\lambda$'/(Pb+$\sigma$2).

(Calculation of Required SNR)

Next, a required SNR (dB) per MCS index can be yielded by expression (35).

Required SNR=lowest receiving sensitivity−equivalent noise power+noise figure  (35)

In expression (35), the lowest receiving sensitivity (dBm) can be obtained from, for example, values of the lowest receiving sensitivities of each MCS index shown in FIG. 5 (see, for example, Tables 22-25 of NPL 1). In one example, in the case of an MCS index 9 (the modulation method is 256 QAM and the coding rate is 5/6) in FIG. 5, the lowest receiving sensitivity is −57 dBm when a band width $\Delta f$ is 20 MHz.

Also, in expression (35), the equivalent noise power (dBm) can be yielded by expression (36).

Equivalent noise power=10 log$_{10}$($KT\Delta f$×1000)  (36)

(where K: Boltzmann constant, T: absolute temperature, $\Delta f$: bandwidth.)

In one example, assuming that the MCS index 9 shown in FIG. 5 is used, the bandwidth $\Delta f$ is 20 MHz, the room temperature is 27 degrees Celsius, the noise figure is 6 dB, calculation based on expression (35) and expression (36) yields a required SNR of approximately 36 dB.

Comparing the required SNR and the instantaneous SINR yielded in the above-described manner enables the selection of a usable MCS index.

(Calculation of Throughput)

Next, a description is given of an example of calculation of throughput.

FIG. 6 represents one example showing a relationship among an MCS index, a GI length, and a transmission speed (see, for example, Tables 22-30 of NPL 1). For example, in FIG. 6, in the case of an MCS index 7 (the modulation method is 64 QAM and the coding rate is 5/6) and a GI length of 800 ns, the throughput is 65 Mb/s.

Here, in the present embodiment, in order to select an MCS index and a GI length that achieve the maximum throughput, a GI length of, for example, 400 ns is used as a reference GI length, instantaneous SINRs are calculated while gradually extending the GI length, and the largest selectable MCS index is yielded by comparison with a required SNR. Then, the throughput is calculated from the current MCS index and GI length, and the throughput is retained when the throughput is larger than the maximum throughput to date. Such a sequence of processes is executed repeatedly, and the sequence of processes is ended when the GI length has exceeded the maximum delay of delay waves, or when the MCS index has become the largest MCS index. In the above-described manner, an MCS index and a GI length that achieve the maximum throughput are selected in the wireless communication system 100 according to the present embodiment. Then, the data transmission station 101 sets the MCS index and the GI length that achieve the maximum throughput, and starts transmission of data signals. For example, when the yielded GI length is 800 nsec and an MCS 4 (the modulation method: 16 QAM, the coding rate: 3/4) has been selected, the transmission control unit 207 sets each of the coding rate: 3/4, the modulation method: 16 QAM, and the GI length: 800 nsec on the information bit generation unit 201, the data signal modulation unit 202, and the GI insertion unit 204, and starts transmission of data signals (main communication).

In the above-described manner, the wireless communication system 100 according to the present embodiment can perform communication by setting an MCS index and a GI length for achieving the maximum throughput based on impulse responses of communication paths that have been estimated by the data reception station 102 using a training signal transmitted from the data transmission station 101.

[Processing Method of Wireless Communication System 100]

Figure 7:
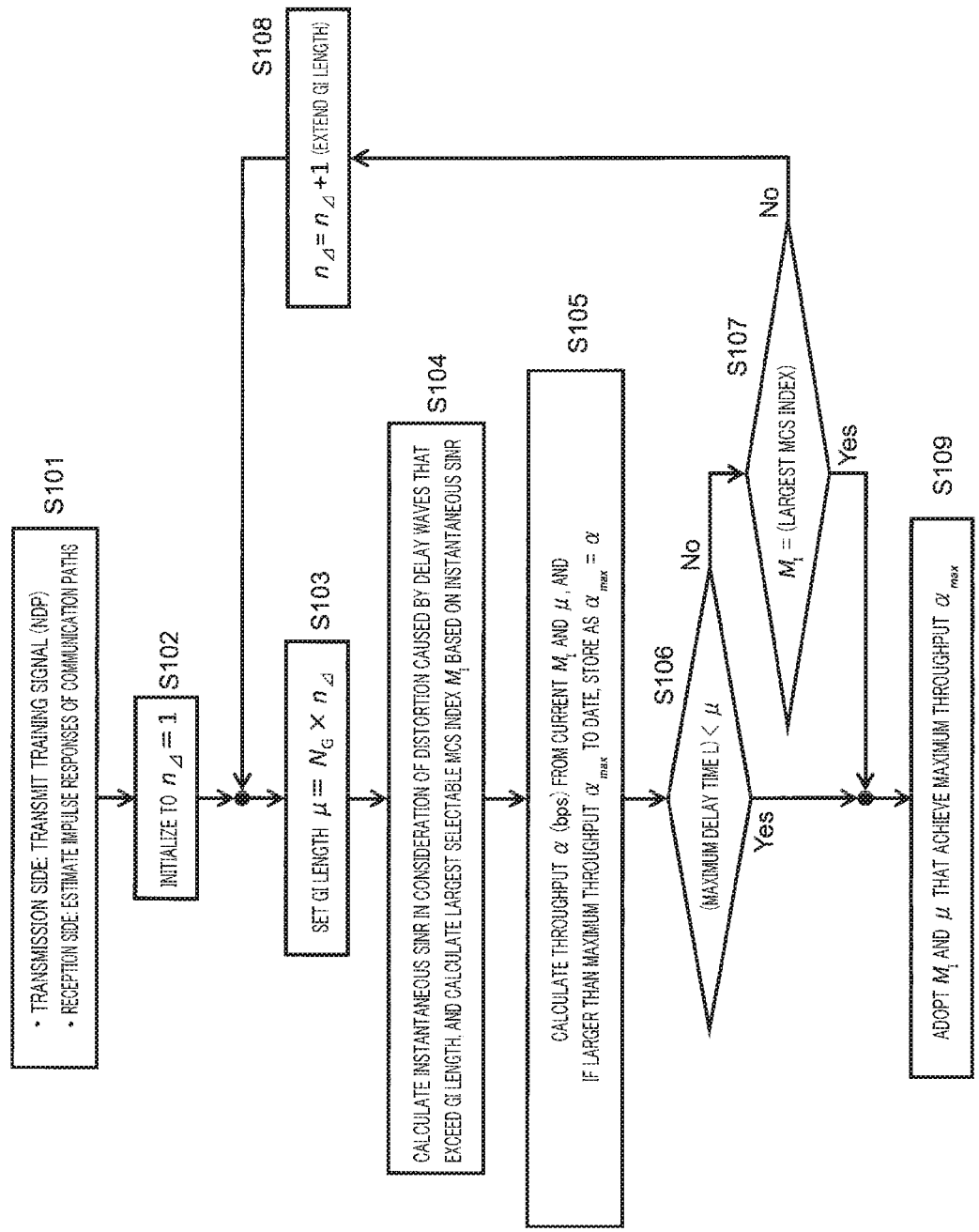
FIG. 7 is a figure showing an example of processing of a wireless communication method according to the present embodiment.

FIG. 7 shows an example of processing of the wireless communication system 100 according to the present embodiment shown in FIG. 1. Note that the processing shown in FIG. 7 is executed by the data transmission station 101 and the data reception station 102.

In step S101, the transmission control unit 207 of the data transmission station 101 transmits a training signal (e.g., an NDP), and the communication path estimation unit 304 of the data reception station 102 performs a process of estimating impulse responses of communication paths from the start to the end. Here, a GI length is set to be sufficiently longer than the expected maximum delay time, and impulse responses that are high in precision from the start to the end are obtained.

In step S102, the transmission control unit 207 sets an incrementing counter $n_A$ for gradually extending the GI length $\mu$ to 1 (initialization).

In step S103, the transmission control unit 207 sets the GT length $\mu$ on the GI insertion unit 204 using expression (37).

$\mu = N_G \times n_A$   expression (37)

Here, $N_G$ denotes a unit length by which the GI length is extended; for example, provided that $N_G$ is the time of one symbol length, the GI length is extended on a per-symbol basis.

In step S104, based on the impulse responses estimated by the data reception station 102, the transmission control unit 207 calculates an instantaneous SINR in consideration of distortion caused by delay waves that exceed the GI length, and calculates the largest MCS index ($M_I$) that is usable with the calculated instantaneous SINR. For example, when the largest MCS index of MCS indexes that are usable with the calculated instantaneous SINR (e.g., MCS indexes with which a required SNR that can ensure a predetermined error rate or less can be obtained) is 4 in FIG. 5 described earlier, the transmission control unit 207 regards the MCS index $M_I$=4.

In step S105, the transmission control unit 207 calculates throughput α (bps) based on the current MCS index $M_I$ and GI length μ. Then, when the calculated throughput α is larger than the maximum throughput $α_{max}$ to date, the calculated throughput α is retained by being stored as the new maximum throughput $α_{max}$ into a memory and the like. Note that in the first-time processing in which the past maximum throughput $α_{max}$ has not been stored, the calculated throughput α is retained as-is as the maximum throughput $α_{max}$.

In step S106, the transmission control unit 207 compares the maximum delay time L obtained from the impulse responses and the like with the GI length μ, and proceeds to the process of step S109 if L<μ is satisfied, and proceeds to the process of step S107 if L<μ is not satisfied.

In step S107, the transmission control unit 207 determines whether the MCS index $M_I$ yielded in step S104 is the largest of the MCS indexes that can be used as the system, and proceeds to the process of step S109 if the MCS index $M_I$ is the largest of the MCS indexes that can be used as the system, and to the process of step S108 if the MCS index $M_I$ is not the largest. For example, in FIG. 5 described earlier, when the MCS index that can be used with the calculated instantaneous SINR is 9, as this MCS index is the largest MCS index that can be used as the system, step S109 follows, whereas when the MCS indexes that can be used with the calculated instantaneous SINR are 0 to 8, step S108 follows, and the processes of step S103 to step S107 are executed repeatedly.

In step S108, the transmission control unit 207 increments the incrementing counter $n_A$ for extending the GI length μ by one, and returns to the process of step S103.

In step S109, when the set GI length μ has exceeded the maximum delay time L of delay waves, or when the selected MCS index $M_I$ has become the largest MCS index that can be used as the system, the modulation and coding method of the MCS index $M_I$ and the GI length μ are adopted as the MCS index $M_I$ and the GI length μ that achieve the maximum throughput $α_{max}$, and main communication is performed.

In the above-described manner, the wireless communication system 100 according to the present embodiment can calculate an MCS index and a GI length that maximize the throughput by estimating impulse responses of communication paths, and transmit data signals.

Figure 8:
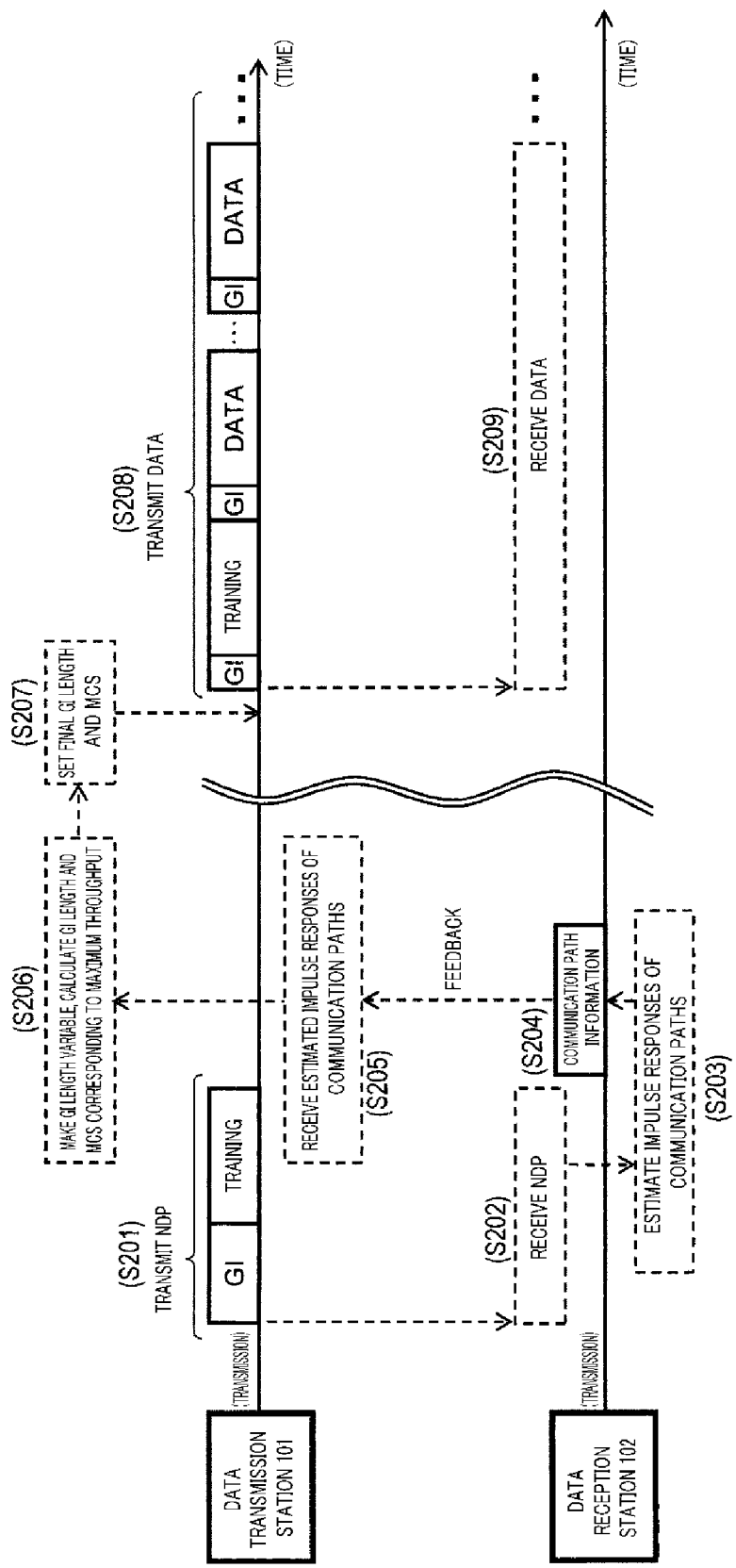
FIG. 8 is a figure showing examples of information and processing pertaining to transmission/reception between the data transmission station and the data reception station.

FIG. 8 shows examples of information and processing pertaining to transmission/reception between the data transmission station 101 and the data reception station 102. In FIG. 8, a horizontal axis represents time and transmission signals of the data transmission station 101 and the data reception station 102.

In step S201, the data transmission station 101 transmits a training signal of an NDP without DATA signals. At this time, the data transmission station 101 transmits the training signal with the addition of a GI that is sufficiently long relative to expected delay waves. In this way, the influences of reduction in signal power caused by a defect in a communication path matrix, distortion caused by interference between symbol blocks, and the like are not exerted, and thus the impulse responses of the communication paths can be estimated until the end with high precision.

In step S202, the data reception station 102 receives the NDP transmitted from the data transmission station 101.

In step S203, the data reception station 102 estimates the impulse responses of the communication paths using the NDP received from the data transmission station 101.

In step S204, the data reception station 102 feeds back communication path information including information of the estimated impulse responses to the data transmission station 101 side.

In step S205, the data transmission station 101 receives the communication path information that has been fed back from the data reception station 102 and includes the impulse responses of the communication paths.

In step S206, the data transmission station 101 calculates an instantaneous SINR from the impulse responses of the communication paths received from the data reception station 102, and executes a sequence of processes of yielding the largest MCS index that can be used with the calculated instantaneous SINR and calculating throughput while gradually extending the GI length (e.g., extension on a per-symbol basis). Then, the data transmission station 101 selects the final MCS index and GI length that achieve the maximum throughput.

In step S207, the data transmission station 101 sets the final MCS index and GI length that have been selected in the process of step S206 and achieve the maximum throughput.

In step S208, the data transmission station 101 starts data transmission (main communication) using the MCS index and the GI length that achieve the maximum throughput.

In step S209, the data reception station 102 receives data signals that have been transmitted from the data transmission station 101 using the MCS index and the GI length that achieve the maximum throughput.

In the above-described manner, the wireless communication system 100 according to the present embodiment can transmit/receive data signals by setting the GI length and the MCS index that maximize the throughput in a long delay wave environment.

As has been described above using the embodiment, the wireless communication system, the wireless communication method, and the transmission device according to the present invention can perform communication with a selection of the optimal GI length and modulation and coding method that achieve the maximum throughput while suppressing the influence of delay waves in single-carrier communication with formation of symbol blocks.

REFERENCE SIGNS LIST

100 Wireless communication system
101 Data transmission station
102 Data reception station
201 Information bit generation unit
202 Data signal modulation unit
203 Transmission weight multiplication unit
204 GI insertion unit
205 Transmission signal conversion unit
111, 112 Antenna
206 Reception signal conversion unit
207 Transmission control unit
301 Reception signal conversion unit
302 GI removal unit
303 Reception weight multiplication unit
304 Communication path estimation unit
305 Transmission signal conversion unit
306 Data signal demodulation unit
307 Information bit detection unit

The invention claimed is:

1. A wireless communication system, comprising:
a transmission device including a processor and a storage medium having computer program instructions stored thereon, when executed by the processor, perform to:
communicate using a single or a plurality of antennas, generates a single-carrier signal in which a data signal or a training signal has been formed as a symbol block, inserts a guard interval into the single-carrier signal and transmits the single-carrier signal, performs, between generating the single-carrier signal and inserting the guard interval, multiplication by a weighting coefficient for separating a signal that is transmitted/received by an antenna, and obtains information of an impulse response of a communication path by transmitting the training signal before starting communication, calculates the weighting coefficient based on the impulse response of the communication path, and determines a modulation and coding method and a length of the guard interval that achieve a maximum throughput in accordance with signal to interference plus noise ratios (SINRs) in a specific period that are calculated by changing the length of the guard interval; and
a reception device including a processor and a storage medium having computer program instructions stored thereon, when executed by the processor, perform to:
communicates using a single or a plurality of antennas, and estimates the impulse response of the communication path using the training signal transmitted from the transmission device, and notifies the transmission device of information of the estimated impulse response of the communication path.

2. The wireless communication system according to claim 1, wherein the computer program instructions of the reception device further perform to demodulates a reception signal by multiplying a signal obtained by removing the guard interval in a signal received from the transmission device by an entirety or a partial share of the weighting coefficient by which the transmission device side performs multiplication.

3. A wireless communication method that performs communication between a transmission device and a reception device that each include a single or a plurality of antennas, the transmission device performing processing for multiplying a single-carrier signal in which a data signal or a training signal has been formed as a symbol block by a weighting coefficient for separating a signal that is transmitted/received by the antenna or antennas, inserting a guard interval into the single-carrier signal, and transmitting the single-carrier signal from the antenna or antennas, and obtaining information of an impulse response of a communication path from the reception device by transmitting the training signal before starting communication, calculating the weighting coefficient based on the impulse response of the communication path, and determining a modulation and coding method and a length of the guard interval that achieve a maximum throughput in accordance with signal to interference plus noise ratios (SINRs) in a specific period that are calculated by changing the length of the guard interval, the reception device performing processing for estimating the impulse response of the communication path using a training signal transmitted from the transmission device, and notifying the transmission device of information of the estimated impulse response of the communication path.

4. The wireless communication method according to claim 3, wherein the reception device demodulates a reception signal by multiplying a signal obtained by removing the guard interval in a signal received from the transmission device by an entirety or a partial share of the weighting coefficient by which the transmission device side performs multiplication.

5. A transmission device, comprising:
a processor;
a storage medium having computer program instructions stored thereon, when executed by the processor, perform to:
communicate using a single or a plurality of antennas; generate a single-carrier signal in which a data signal or a training signal has been formed as a symbol block; insert a guard interval into a signal output from the modulation unit and transmit the signal from the communication unit; multiply by a weighting coefficient for separating a signal that is transmitted/received by the antenna or antennas; and obtain information of an impulse response of a communication path from a reception device by transmitting a training signal before starting communication, calculate the weighting coefficient based on the impulse response of the communication path, and determine a modulation and coding method and a length of the guard interval that achieve a maximum throughput in accordance with signal to interference plus noise ratios (SINRs) in a specific period that are calculated by changing the length of the guard interval.

* * * * *